UNITED STATES PATENT OFFICE 2,572,842

THE N-CARBOANHYDRIDE OF 2-AMINO-4,6,6-TRIMETHYLHEPTANOIC ACID AND POLYMERS THEREFROM

Robert N. MacDonald, New Castle, Del., assignor to E. I. du Pont de Nemours & Company, Wilmington, Del., a corporation of Delaware No Drawing. Application October 7, 1947, Serial No. 778,459

11 Claims. (Cl. 260—77.5)

This invention relates to a new amino acid, to its derivatives and to polymers produced therefrom.

It is known that polymers can be prepared by simply heating monoaminomonocarboxylic acids in which the amino and carboxyl groups are separated by a chain of at least 5 carbon atoms. Some success has also been achieved in making polymers from selected derivatives of alpha-amino carboxylic acids. For the most part, however, these alpha-amino acid polymers have poor solubility.

This invention has as an object the preparation of compounds comprising a new and useful amino acid and derivatives thereof. A further object is the production of improved polymers of the amino acid type. Other objects will appear hereinafter.

The above objects are accomplished by the preparation of 2-amino-4,6,6-trimethylheptanoic acid and its amide-forming derivatives, and by the polymerization of this acid and said derivatives to polymeric materials.

The above mentioned amino acid is obtained from 3,5,5-trimethylhexanal, for example, by reaction with ammonium cyanide and ammonium carbonate followed by acid hydrolysis of the resulting hydantoin as shown by the reactions illustrated below. For preparing polymers of the 2-amino-4,6,6-trimethylheptanoic acid, a suitable method consists in forming the carboanhydride and polymerizing the latter either alone or with other carboanhydrides. Polymerization occurs by condensation with evolution of carbon dioxide at temperatures of from 25° C. to 200° C.

The following examples further illustrate the preparation of this amino acid and of several of its amide-forming derivatives, and of the preparation of polymers. In the examples, the parts given are by weight.

EXAMPLE I (A) *Preparation of 5-(2,4,4-trimethylpentyl)-hydantoin*

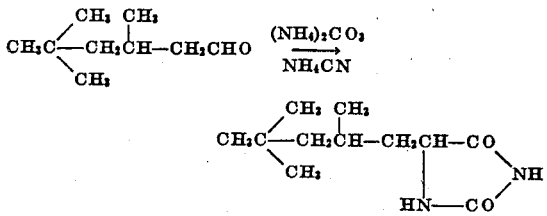

To a solution of 142 parts of 3,5,5-trimethylhexanal in 545 parts of ethanol was added a solution of 60 parts of ammonium chloride in 180 parts of water. As the reaction mixture was stirred at 15° C., 51.5 parts of 95% sodium cyanide in 150 parts of water was added during a half-hour period. The reaction mixture was then stirred at room temperature for 3 hours; 250 parts of (NH4)2CO3.H2O was added; and stirring was continued at 55–60° C. for 4 hours. Excess ammonium carbonate was decomposed at steam bath temperature, the reaction mixture repeatedly concentrated and cooled until no further precipitate formed, and the crude hydantoin filtered off at each stage. The combined precipitates were dissolved in 5% aqueous sodium hydroxide and extracted several times with ether to remove unreacted aldehyde. The residual basic solution was decolorized with activated charcoal and the hydantoin precipitated by acidifying with hydrochloric acid. After recrystallization from alcohol-water, there was obtained 142 parts (67% of theoretical) of white crystals of pure 5-(2,4,4-trimethylpentyl)hydantoin melting at 189–190° C.

The 3,5,5-trimethylhexanal referred to above can be obtained by reaction of carbon monoxide and hydrogen with diisobutylene at elevated temperatures and pressures in the presence of a hydrogenation catalyst. (This is described in copending application, S. N. 758,477.)

(B) *Preparation of 2-amino-4,6,6-trimethylheptanoic acid*

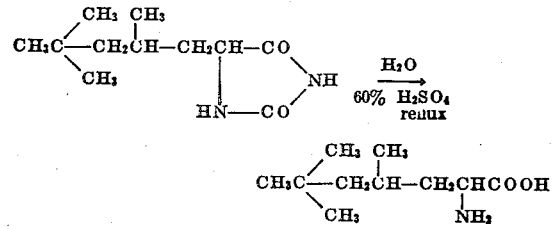

One hundred and fifty parts of 5-(2,4,4-trimethylpentyl)hydantoin was hydrolyzed by refluxing for 2 days with 450 parts of 60% sulfuric acid. The hydrolysis mixture was diluted with 600 parts of water and decolorized with activated charcoal. After the addition of 20% ammonium hydroxide until a pH of 6 was reached, the resulting precipitate of the amino acid was filtered, washed once with water, and dissolved in 5% sodium hydroxide. The resulting solution was decolorized with charcoal and brought to a pH of 6 by controlled addition of hydrochloric acid. The precipitated amino acid was filtered and washed until the wash water gave a negative chloride test with silver nitrate. Concentration of the wash water gave another small yield of product. The products were combined and recrystallized from a large quantity of hot water. There was obtained 123 parts (92% of theory) of pure crystalline 2-amino-4,6,6-trimethylheptanoic acid melting with decomposition at 228–230° C. Neutral equivalent—calcd., 187.3; found, 189.6.

The amino acid was characterized through its benzoyl derivative, N-benzoyl-2-amino-4,6,6-trimethylheptanoic acid, melting at 138–140° C. Neutral equivalent—calcd., 291.37; found, 291.7.

EXAMPLE II

*Preparation of N-carbomethoxy-2-amino-4,6,6-trimethylheptanoic acid*

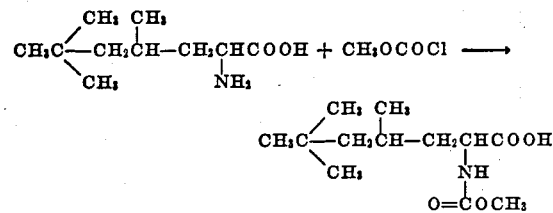

One hundred and eighty-seven parts of 2-amino-4,6,6-trimethylheptanoic acid was dissolved in 250 parts of 4 N sodium hydroxide. After dilution with 300 parts of water, the solution was cooled to 10° C. While maintaining the solution at this temperature by means of an ice bath and continuous stirring, 94.5 parts of carbomethoxy chloride and 250 parts of 4 N sodium hydroxide were added simultaneously from two dropping funnels over a period of one day. The acid chloride addition was started slightly ahead of that of the sodium hydroxide, the rates being adjusted so that the addition of both ended together, i. e., so that the acid chloride was present in excess of the alkali until the end of the acylation. Stirring at ice-bath temperature was continued for an additional hour, after which the reaction mixture was twice extracted with ether and acidified with hydrochloric acid to a pH of approximately 2. The heavy, white oil formed was extracted with ether and the ethereal solution then added to 120 parts of sodium bicarbonate dissolved in water. After the carbalkoxy derivative of the amino acid had all reacted with the sodium bicarbonate, the water layer was separated and decolorized with charcoal. The resulting solution was cooled to 10° C.; hydrochloric acid was added until a pH of 2 was reached; the snow-white precipitate product was filtered, washed with water until the wash water was free of chloride ion, and finally dried at room temperature. There was obtained 201.5 parts (82.5% of theory) of pure N-carbomethoxy-2-amino-4,6,6-trimethylheptanoic acid melting at 76–78° C. Neutral equivalent—calcd., 245.4; found, 244.9.

EXAMPLE III

*Preparation of the N-carboanhydride of 2-amino-4,6,6-trimethylheptanoic acid*

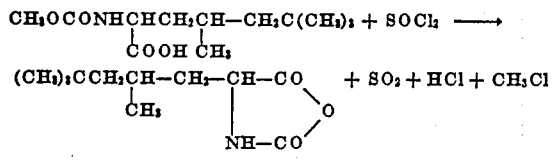

In a vessel protected by drying tubes from atmospheric moisture were mixed 30 parts of N - carbomethoxy - 2 - amino - 4,6,6 - trimethylheptanoic acid and 49.7 parts of thionyl chloride. Reaction began at once, as evidenced by evolution of sulfur dioxide and hydrogen chloride, and a clear solution was obtained in 15 minutes. On standing overnight a dark crystalline mass was obtained. Excess thionyl chloride was removed under reduced pressure and the product washed with petroleum ether to give 17.3 parts (65% of theoretical) of white crystalline N-carboanhydride of 2-amino-4,6,6-trimethylheptanoic acid. This was dissolved in 187 parts of chloroform at 40° C., treated with a small amount of activated charcoal for 2 minutes, filtered, 268 parts of petroleum ether added, and the resultant solution cooled at 0° C. for one hour to give 14.3 parts (83% recovery) of snow-white needles of the N-carboanhydride of 2-amino-4,6,6-trimethylheptanoic acid melting at 105° C. when inserted in a melting-point bath heated at this temperature.

Anal.—Calcd. for $C_{11}H_{19}NO_3$: C, 61.94; H, 8.98; N, 6.57. Found: C, 62.06, 62.19; H, 9.09, 9.17; N, 6.25, 6.26.

The following examples illustrate the manufacture of 2-amino-4,6,6-trimethylheptanoic acid polymers and copolymers and the preparation of films therefrom.

EXAMPLE IV

Three (3) parts of the N-carboanhydride of 2-amino - 4,6,6 - trimethylheptanoic acid was heated at 146° C. at atmospheric pressure under nitrogen. Vigorous evolution of carbon dioxide began within one minute. The melt became viscous within 4 minutes and within 25 minutes a white solid polyamide of 2-amino-4,6,6-trimethylheptanoic acid was obtained in quantitative yield. The polyamide softened at 165° C. and decomposed at 335° C. without melting. It was soluble in diethyl ether, chloroform, partially soluble in benzene, and insoluble in m-cresol. A clear, tough, transparent film was obtained from a chloroform solution of the polymer by casting onto a smooth surface and evaporating the chloroform.

EXAMPLE V

A solution of 5 parts of the N-carboanhydride of L-leucine and 5 parts of the N-carboanhydride of 2-amino-4,6,6-trimethylheptanoic acid in 44 parts of benzene containing 0.028% water was heated at 60° C. for 17 hours to give a clear, colorless, highly viscous solution from which was cast a clear, tough film of the copolyamide of L-leucine and 2-amino-4,6,6-trimethylheptanoic acid. The copolyamide softened at 220–225° C, was soluble in chloroform, benzene, isoamyl bromide, and insoluble in m-cresol, phenol, formic acid, cyclohexanone, benzyl alcohol, and amyl acetate. The film of the copolyamide was oriented by cold drawing, as evidenced by X-ray diffraction studies. The film exhibited a dry tenacity of 2620 lb./sq. in. at a break elongation of 22.5%.

EXAMPLE VI

A solution of one part each of the N-carboanhydrides of 1-aminocyclohexanecarboxylic acid and 2-amino-4,6,6-trimethylheptanoic acid in 75 parts of chloroform containing 0.001 part (0.13 mole per cent based on total N-carboanhydrides) of diethylamine was heated at 50° C. for 3 days. A thin layer of this solution was poured onto a glass plate and the solvent evaporated. There was obtained a clear, brittle film.

EXAMPLE VII

A mixture of 10 parts of the N-carboanhydride of 2-amino-4,6,6-trimethylheptanoic acid and 5 parts of the N-carboanhydride of DL-alanine was heated in 659 parts of reagent benzene containing 0.025% water at 65° C. for 3 days to give a viscous clear solution. A film cast from this solution was optically clear, colorless, qualitatively tough, flexible and could be cold drawn. This solution was readily coagulated by methanol and similar non-solvents for the polymer to give fibers and films. Clear colorless films were also cast from chloroform. The polymers were insoluble in m-cresol. The polymer darkens at 280° C., softens on a copper block at 297° C., and decomposes to an ash at 343° C.

EXAMPLE VIII

A mixture of 1 part of the N-carboanhydride of 2-amino-4,6,6-trimethylheptanoic acid and 1 part of the N-carboanhydride of DL-alanine was heated in 44 parts reagent benzene (0.025% water) at 65° C. for 2 days to give a clear, colorless, somewhat viscous solution. A film cast from this solution was transparent, qualitatively tough, and could be cold drawn. It was more water-sensitive than the homopolymer of 2-amino-4,6,6-trimethylheptanoic acid. The polymer darkens at 260° C., softens at 320° C. on a copper block, and decomposes to an ash at 350° C.

EXAMPLE IX

A solution consisting of 1 part of the N-carboanhydride of 2-amino - 4,6,6 - trimethyl - heptanoic acid, 22 parts of anhydrous xylene and 0.0069 part m-cresol was heated at 115° C. for 21.5 hours. Films cast from this hot solution were clear and flexible and were insoluble in m-cresol. The xylene solution was readily coagulated in methanol or similar non-solvents for the polymer to give fibers and films. The polymer softened on a copper block heated at 301° C. and darkened at 322° C. with decomposition to an ash at 350° C.

Amide-forming derivatives in addition to the N-carboanhydride already mentioned, are the esters. These can be prepared by esterification of the acid with an alcohol in the presence of hydrogen chloride. Typical esters of 2-amino-4,6,6-trimethylhelptanoic acid are the methyl, ethyl, amyl, cyclohexyl and benzyl esters.

The polymers of this invention are linear condensation polyamides containing recurring groups of the formula:

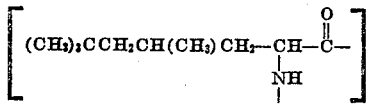

In the case of the copolymers, the polymer will of course contain additional units in the polymer chain. On hydrolysis with hydrochloric acid both the simple polymer and the copolymers yield 2 - amino - 4,6,6 - trimethylheptanoic acid. The polymers will usually contain at least 25 amino acid units, i. e., the degree of polymerization will be at least 25. The polymers will generally have softening points above 125° C. When at least 10% of the recurring unit of the copolymer is composed of the 2 - amino - 4,6,6 - trimethyl - heptanoic acid residue indicated in the above formula, improved solubility of the copolymers attributable to the aminotrimethylheptanoic acid is obtained. For this reason, copolyamides having more than 10% and generally more than 50% of the units derived from the 2-amino-4,6,6-trimethylheptanoic acid are preferred.

As specific examples of alpha amino acids, whose N-carboanhydrides can be copolymerized with 2 - amino - 4,6,6 - trimethylheptanoic acid there are included the following: valine, alanine, norleucine, isoleucine, sarcosine, 1 - aminocyclohexanecarboxylic acid, 1 - amino - 2 - methylcyclohexanecarboxylic acid, alpha-aminoisobutyric acid, N-phenylglycine, 1-amino-cyclopentanecarboxylic acid, and 3-aminotetrahydrothiophene-3-carboxylic acid. Examples of beta-amino acids that may be used in the preparation of copolyamides with 2-amino-4,6,6-trimethylheptanoic acid, beta-aminobutyric acid, beta-methyl · beta - aminobutyric acid, beta - phenyl - beta-aminopropionic acid, aminopivalic acid and beta-aminovaleric acid.

The polyamides as defined above can be prepared by heating in the presence of or absence of organic liquids. Suitable organic liquids that can be used include dibutyl ether, chloroform, xylene, diethyl ether, diphenyl ether, carbon tetrachloride, cyclohexanone, and glycol diethyl ether. The carboanhydrides are suitably heated under oxygen-free conditions in a vessel adapted to permit escape of carbon dioxide to that temperature at which carbon dioxide begins to be evolved at an appreciable rate. This varies with different amino acids but is usually at temperatures from 25° C. to 200° C., and is generally within 50° C. of the melting point of the carboanhydride and in case of mixtures within 30° C. of the lowest melting carboanhydride. The time of reaction may be shortened or the temperature necessary may be lowered or both may be accomplished by the use of reaction initiators such as water; alcohols, e. g., butanol; phenols, e. g., phenol itself and the cresols; organic acids, e. g., acetic acid and adipic acid; or amino-hydrogen-containing amines, e. g., butylamine, aniline and tetramethylenediamine.

The polyamides of this invention can be used to produce films and fibers. They may also be molded. The polyamides are soluble generally in one or more of the following solvents such as chloroform, diethyl ether, xylene, carbon tetrachloride, cyclohexanone, and they may be plasticized with high boiling compounds, such as polychlorinated diphenyl ether and camphor.

As many apparently widely different embodiments of this invention may be made without departing from the spirit and scope thereof, it is to be understood that I do not limit myself to the specific embodiments thereof except as defined in the appended claims.

I claim:

1. The carboanhydride of 2-amino-4,6,6-trimethylheptanoic acid.

2. A linear polymer whose recurring units are monoaminomonocarboxylic acid units of the class consisting of alpha-aminocarboxylic acid units and beta-aminocarboxylic acid units at least 10% of said recurring units being of the formula

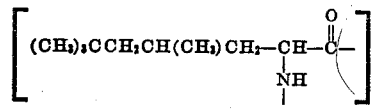

3. A process for making polymers which comprises heating to polymerizing temperature with loss of carbon dioxide the carboanhydride of 2-amino-4,6,6-trimethylheptanoic acid.

4. A linear condensation polymer whose recurring units are monoaminomonocarboxylic acid units of the class consisting of alpha-aminocarboxylic acid units and beta-aminocarboxylic acid units of which at least 50% are of the formula

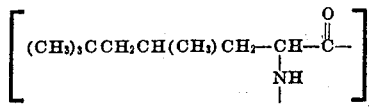

5. A linear condensation polymer whose recurring units are monoaminomonocarboxylic acid units of the class consisting of alpha-aminocarboxylic acid units and beta-aminocarboxylic acid units, which is hydrocarbon except for the amino and carboxyl groups, at least 50% of the units being of the formula

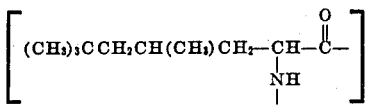

6. A linear polymer whose recurring units are alpha-monoaminomonocarboxylic acid units at least 10% of said recurring units being of the formula

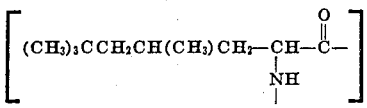

7. A linear condensation polymer whose recurring units are alpha-monoaminomonocarboxylic acid units of which at least 50% are of the formula

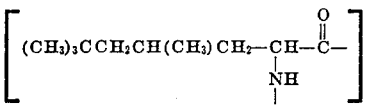

8. A linear condensation polymer whose recurring units are alpha-monoaminomonocarboxylic acid units, which acids are hydrocarbon except for the amino and carboxyl groups, at least 50% of the units being of the formula

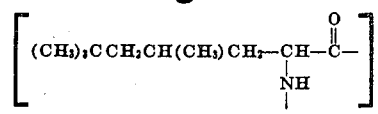

9. A linear polyamide whose recurring units are of the formula

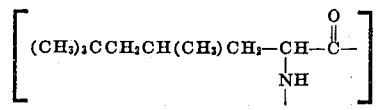

10. A linear polyamide whose recurring units are L-leucine units and, in amount at least 10% of the total units, units of the formula

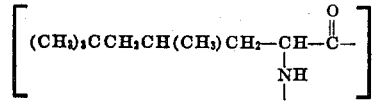

11. A linear polyamide whose recurring units are DL-alanine units and, in amount at least 10% of the total units, units of the formula

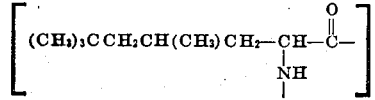

ROBERT N. MacDONALD.

REFERENCES CITED

The following references are of record in the file of this patent:

UNITED STATES PATENTS

| Number | Name | Date |
|---|---|---|
| 2,327,162 | Baldwin et al. | Aug. 17, 1943 |
| 2,517,916 | Pavlic | Aug. 8, 1950 |

OTHER REFERENCES

Chemical Abstract, vol. 34, pages 1971–1972, citing Yukiti Go et al., Bull. Chem. Society, Japan, 14, pages 510–516 (1939).